(12) United States Patent
Brückl et al.

(10) Patent No.: US 8,104,345 B2
(45) Date of Patent: Jan. 31, 2012

(54) MINIATURE ACCELERATION SENSOR

(75) Inventors: Hubert Brückl, Maria Enzersdorf (AT); Michael Kast, Vienna (AT)

(73) Assignee: Austrian Research Centers GmbH-Arc, Vienna (AT)

( * ) Notice: Subject to any disclaimer, the term of this patent is extended or adjusted under 35 U.S.C. 154(b) by 425 days.

(21) Appl. No.: 12/376,833

(22) PCT Filed: Aug. 6, 2007

(86) PCT No.: PCT/AT2007/000380
§ 371 (c)(1),
(2), (4) Date: Mar. 24, 2009

(87) PCT Pub. No.: WO2008/017090
PCT Pub. Date: Feb. 14, 2008

(65) Prior Publication Data
US 2010/0132465 A1    Jun. 3, 2010

(30) Foreign Application Priority Data
Aug. 7, 2006  (AT) ................. A 1317/2006

(51) Int. Cl.
*G01P 15/105* (2006.01)
(52) U.S. Cl. ................... 73/514.31; 73/514.38
(58) Field of Classification Search ........... 73/514.31, 73/514.38
See application file for complete search history.

(56) References Cited

U.S. PATENT DOCUMENTS

| | | | |
|---|---|---|---|
| 6,131,457 A * | 10/2000 | Sato | 73/514.31 |
| 6,611,178 B1 | 8/2003 | Kawakatsu et al. | |
| 7,305,882 B1 * | 12/2007 | May | 73/514.31 |
| 2005/0064731 A1 | 3/2005 | Park et al. | |

FOREIGN PATENT DOCUMENTS

| | | |
|---|---|---|
| EP | 1203749 A1 | 5/2002 |
| WO | 03053851 A1 | 7/2003 |

OTHER PUBLICATIONS

Vu Thien Binh et al: "A mechanical nanosensor in the gigahertz range: where mechanics meets electronics" Surface Science, North-Holland Publishing Co, Amsterdam, NL, vol. 301, No. 1-3, Jan. 10, 1994, pp. L224-L228, XP002421608 ISSN: 0039-6028.

* cited by examiner

*Primary Examiner* — Freddie Kirkland, III
(74) *Attorney, Agent, or Firm* — Laurence A. Greenberg; Werner H. Stemer; Ralph E. Locher (57) ABSTRACT

A miniature sensor for detecting acceleration and deceleration processes has at least one bar-like spring element which is formed by a nanowire, which is connected by one end to the detector substrate and projects from the latter and which preferably carries at its free end a coating emitting a permanent magnetic stray field, or a nanoparticle of this type, wherein the nanowire and magnetic stray field coating, or mass, together form the inertial mass. A magnetic field detection layer composed, for example, of magnetoresistive material, is disposed at least in the region near the connected end of the nanowire. The substrate is preferably provided with such a layer which preferably, for its part, as sensor component forms a constituent part of a magnetic field detection unit.

28 Claims, 5 Drawing Sheets

MINIATURE ACCELERATION SENSOR

BACKGROUND OF THE INVENTION

Field of the Invention

The present invention relates to an acceleration sensor that reacts to external forces and supplies an electrical signal in the process. The acceleration sensor itself is concomitantly moved with the system which is to be detected and which is exposed to an acceleration or deceleration.

An acceleration sensor is a sensor transducer that measures the acceleration by determining the inertial force acting on a test mass. It is thus possible, to determine, for example, whether an increase or decrease in velocity takes place and also the magnitude thereof. Sensors integrated in the moved system are used for detecting such an external inertial force. They are concomitantly moved with said system, such that usually it is not necessary to use external fixed points for detecting the movement.

A central part of any acceleration sensor, therefore, is an element which changes one of its physical properties on account of the external force. If the acceleration sensor has a spring-mass system, for example, then for example a position of the mass suspended by means of the spring in relation to a fixed point of the sensor can be used for determining movement.

Known technical solutions of acceleration sensors are based on a wide variety of physical effects and detection methods. Known traditional acceleration sensors are the following:

Strain gauges: the force on the test mass is determined by the deformation of the fixing, e.g. of a bar, being determined by means of strain gauges. This system is suitable primarily for low frequencies.

Magnetic induction: during the movement of the test mass suspended on a spring, an electrical voltage is induced in a coil by a magnet, in a manner similar to that in a dynamic microphone, i.e. moving-coil microphone.

Miniaturized sensors are more precise, more sensitive, smaller and lighter than the sensors just explained. They are usually constructed with piezoelectric sensors or as microelectromechanical systems (MEMS):

Piezoelectric acceleration sensors: a piezoceramic sensor lamina converts dynamic pressure fluctuations into electrical signals which can then correspondingly be processed further. The pressure fluctuation is produced by a "seismic" mass fixed to the piezoceramic and acts on the piezoceramic during an acceleration of the overall system. This system is used e.g. in wheel balancing machines, where any unbalance of the wheel generates a corresponding signal in the piezoceramic. It identifies the unbalance on the tire within seconds.

One type of sensor that is widely used owing to its economic viability is based on MEMS technology. MEMS is the combination of mechanical elements, sensors, actuators and electronic circuits on a substrate or chip. MEMS are based on semiconductor electronics. The base material or substrate is generally silicon, but also gallium arsenide. Microelectronics is limited to electrical components such as transistors (CPU) and capacitors (RAM). Microsystems technology extends this pallet by mechanical, optical, chemical and/or biological components. MEMS can be integrated using silicon technology and therefore be produced and packaged in large numbers in a batch-fabricated manner.

MEMS-based miniaturized acceleration sensors have increasingly gained in importance in recent years. These sensors are spring-mass systems in which the "springs" are silicon webs just a few μm wide, and the mass is also produced from silicon. As a result of the deflection upon acceleration, a change in the electrical capacitance can be measured between the part suspended in a sprung manner and a fixed reference electrode. The total measurement range corresponds to a change in capacitance of only approximately 1 pF; therefore, the electronics for evaluating this small change in capacitance have to be integrated directly onto the same semiconductor component.

For the production of these sensors, the mass and the small silicon springs or silicon pegs are etched out from the silicon by means of photolithography. In order to obtain a self-supporting structure, an underlying layer composed of silicon dioxide is likewise removed by etching.

This type of acceleration sensors has the advantage of relatively low unit costs as a result of mass production and high reliability. Some of such sensors can even withstand accelerations up to a thousand times the measurement range without damage. Owing to the small size, they are also distinguished by high measurement speed. They are therefore used e.g. for triggering air bags in vehicles.

Acceleration is a mechanical quantity that plays a major part in many areas of technology. Small sensors have measurement ranges of a few "g" (acceleration due to gravity) up to dozens or even hundreds of g and are in many cases also very robust with respect to impact. The accuracies are usually in the percent or per mille range.

More precise, but larger instruments nowadays yield accuracies of well above 1:1 million and permit e.g. a measurement of differential accelerations in Earth satellites. In mining and engineering, the control of lifts by accelerometers was implemented early on since a one-dimensional measurement system suffices here. The same type of acceleration measurement is also indispensible for rocket technology and the analysis of vehicle movements or automotive electronics.

Many technical applications require full three-dimensional measurements, for instance in mechanical engineering, for the control of robots or in space travel. Here miniaturization is an important prerequisite—alongside insensitivity to temperature, vibrations and other effects. Numerous applications manage with 2D sensors, however, principally if movements in one plane are involved. Precision accelerometers are also used in some instances for measurements in the Earth's gravity field—see gravimetry and gradiometry, and in the ESA satellite GOCE.

Acceleration sensors therefore have a multiplicity of possible uses, just a few examples of which shall be mentioned here:

Measurement of linear accelerations by means of accelerometers

Measurement of vibrations on buildings and machines

Active spring suspension systems in vehicles

Alarm systems for moveable goods or as touch sensor

Damage investigations when transporting merchandise

Seismic equipment and earthquake prediction

Inclination measurement in static systems which are employed in particular when other accelerations are negligible in comparison with the acceleration due to gravity, Active loudspeakers Together with gyroscopes for position regulation or stabilization of aircraft, such as helicopters, or UAVs.

In the field of mobile telephony; in other words, the acceleration sensor permits a wide variety of control options for a mobile phone.

In the field of medicine and care: the motion sensor recognizes if a person remains motionless—a correspondingly equipped alarm device immediately calls medical assistance.

Safeguarding objects: the sensor registers whether an object that should as a rule not move is moving. For example the trailer at a campground. In this case, too, the alarm is triggered in the event of movement.

Protection against falls: the sensor recognizes whether a notebook is falling to the ground. In the case of dropping the read heads of the hard disk are rapidly brought to a parked position in order to avoid loss of data.

Monitoring of vibrations: the sensor is also suitable for transporting valuable works of art, in order to be able to ascertain what vibrations they were exposed to during their journey.

Computer mouses that function everywhere: the motion sensor can register mouse movements even without optical scanning of the base—even in all three directions.

Bosch has been manufacturing MEMS sensors for use in automotive engineering since 1988—to date more than 400 million items. These sensors have to function reliably for the entire life of an automobile under inhospitable conditions such as extremely fluctuating temperatures and vibrations. Experience from the development and mass production of sensors in the field of motor vehicle technology supports the reliability and longevity of the most recent sensor innovation in this regard. These properties also benefit the sensors which are used in everyday appliances, that is to say in consumer appliances. The acceleration sensor withstands for example acceleration loads up to 10 000 times the Earth's gravitational force.

As far as disadvantages in acceleration sensors corresponding to the current prior art are concerned, the following should be explained in this respect:

A comparison is made here only with miniaturized sensors since other sensors have a significantly poorer performance. Disadvantages of conventional miniaturized acceleration sensors are as follows:

Piezo-sensors: constant accelerations, such as e.g. acceleration due to gravity, cannot be detected by piezoelectric acceleration sensors.

MEMS: although MEMS technology is reliable and expedient, particularly owing to the large numbers, it nevertheless requires high precision and expensive machinery. MEMS often have separate electronics on a separate chip. An integration of electronics and acceleration nanosensor is admittedly possible, but complicated.

BRIEF SUMMARY OF THE INVENTION

The invention is based on the object of replacing the technologically complicated MEMS structures by cost-effective and simple sensor structures. Therefore, consideration has been given to firstly self-assembling nanowires as inertial mass and oscillating systems, secondly magnetic particles and furthermore magnetoresistive layer systems as detector units.

The invention therefore relates to a novel miniature sensor for detecting and determining acceleration and deceleration processes of masses, objects or the like, wherein said sensor comprises at least one inertial mass that is arranged on a spring element and emits a field, at least one detector sensitive to field strength changes, and also an indication unit and can be concomitantly moved with the mass, the object or the like, in accordance with the preamble of claim 1, which has the features mentioned in the characterizing part of said claim.

The present invention is based, in particular, on the combination of nanowires and MR detectors for the object appertaining to the sensor. In the case of the present invention, the inertial mass is composed of magnetic material and the spring is composed of a nanowire. This invention utilizes, for determining the position of the inertial mass, the change in the resistance in a magnetoresistive MR detector that reacts to magnetic stray fields of the inertial mass.

As far as the concrete prior art in the field of acceleration sensors and the difference with respect to the present invention are concerned, in this respect U.S. Pat. No. 6,131,457 A shall be cited, which relates to the traditional arrangement of an acceleration sensor in accordance with conventional MEMS technology such as has already been discussed above as prior art.

The very significant and conspicuous between this technology used in accordance with the US-A and the differences with respect to the present invention consist in the following:
a) In accordance with the cited US-A, the spring element therein must explicitly have a three-dimensional freedom of movement. By contrast, the spring element, that is to say the nanowire or the mass element seated on the free end thereof in accordance with the invention has an only spherical and hence not a radial and hence only a two-dimensional freedom of movement, owing to the novel arrangement of the measuring elements according to the invention.
b) Whereas at least four mutually separate detector elements are necessary totally clearly and explicitly in accordance with the US-A, only a single detector unit in the form of a thin magnetoresistive layer on the substrate is provided in accordance with the invention.
c) The way in which the detector unit used in accordance with the US-A is produced is fundamentally different than the case in the invention. In accordance with the US-A, the particularly complicated MEMS technology is employed, in which at least four detectors have to be provided on a separate plane, while on the other plane, which is situated at a distance therefrom, which practically floats above the first plane and can be bent in the Z direction, a plurality of tongues or the like have to be moved in the x and y directions by the respectively accelerating or decelerated mass, that is to say that the tongues are moved in the x, y and z directions, that is to say in all three spatial directions.

The abovementioned four tongues 2c in accordance with the US-A correspond functionally approximately to the nanowire or single crystal of the present invention, while the pin 4 in accordance with said US-A substantially corresponds to the mass 3 of the mass particle situated at the end of the nanowire in accordance with the invention. In the case of the MEMS technology employed in accordance with the US-A, the tongues are arranged on a substantially floating plane, as mentioned above.

Furthermore it should be emphasized that self-assembly of single crystal or nanowires, that is to say inherent growth thereof, as employed according to the invention is in contrast not employed in the MEMS technology. It is precisely this self-assembly, however, which permits the totally novel concept in accordance with the invention, which ultimately results in the essential differences mentioned under a) and b) between the prior art provided by U.S. Pat. No. 6,131,457 A and the present invention.

Last but by no means least it should be pointed out that the sensors in accordance with the US-A under discussion here can only be produced on the micro scale, whereas the technology of the present invention is realized in the nano range.

Furthermore, WO 03/053851 A2 should be mentioned here, which, in particular in accordance with claim 1 therein and FIG. 12 therein describes an arrangement for measuring bending forces by means of a nanowire, but the latter must necessarily be composed of a piezoelectric material. The measurement signal in that case is a voltage which is caused by the piezoelectric effect of the nanowire itself.

The very significant and conspicuous differences with respect to the present invention consist in the following:

Whereas explicitly piezoelectric nanowires, composed of transition metal oxides, are addressed in accordance with said WO-A2, such materials have to be specifically avoided for the self-grown nanowires or single crystals in accordance with the invention, since the invention is directed toward nanowires or single crystals composed of an expressly electroneutral material.

The piezoelectric effect of the piezoelectric nanowires to be used in accordance with the WO-A2 would have a disturbing effect on the measuring method with the device according to the invention in such a way that practically no results should be expected.

d) Therefore, explicitly piezoelectric detection is effected in the cited WO-A2, and a magnetic interaction is measured in accordance with the invention.

e) Whereas explicitly the nanowire itself therefore functions as detector unit in the cited WO-A2, the device of the in accordance with the invention operates with a separate detector unit of a single magnetoresistive layer system and the nanowire functions in accordance with the invention in this sense as merely a passive element conveying the acceleration or deceleration to be measured.

WO 2005/038468 A1 should furthermore be mentioned, which describes a fundamentally different variant of an acceleration sensor that operates by means of the detection of an emission current.

EP 1203749 A1, which should finally also be cited, describes a device for force measurement in an atomic force microscope or possibly on a mass spectrometer. The construction described therein is absolutely unable to measure an acceleration or force independently. An integrated construction such as is present in accordance with the invention is not provided in that case. Optical measurement, electron radiation with current measurement and surface acoustic waves are mentioned therein as possible additional detector units.

The devices and the measurement methods performed therewith in accordance with the two documents mentioned above therefore differ fundamentally from the present invention and also have a different objective such as precisely e.g. as sensor elements for atomic force microscopy in the non-contact operating mode.

Claim 2 provides for the nanowire to be grown up from the detector substrate. Self-assembly is defined as a fundamental physical principle for structure formation. It is defined as reversible process in which already existing parts (for example molecules) self-assemble to form a more complex structure or pattern [10]. A typical example is the self-assembly of nanowires from corresponding molecules in the gas phase deposition in the presence of a catalyst or catalytically active particle.

Claim 3 discloses a preferred manner of forming the nanowire below a growth seed which ultimately itself forms the stray field magnet mass at the end of the single crystal.

Claim 4 specifies preferred locations of the nanowire at which the magnetic coating or the magnetic nanoparticle is arranged, and furthermore preferred materials therefor with the aim of achieving the highest possible signal strengths.

Claim 5 reveals a material advantageously provided for the formation of the magnetic field detection layer.

With regard to favorable methods for the formation of the nanowire, reference should be made to claim 6.

As far as the binding of the magnetic nanoparticle to the single crystal or nanowire is concerned, claim 7 provides more detailed information about this.

Preferred techniques for applying a magnetic coating to the nanowire are mentioned in claim 8.

Claim 9 specifies preferred materials for the nanowire in the context of the invention.

Claim 10 reveals an advantageous arrangement of the magnetic field detection layer with regard to the arrangement of the nanowire.

Claim 11 also concerns a favorable geometry of the novel acceleration sensor, specifically the embodiment and angular position of the nanowire in relation to the magnetic field detection layer.

Claims 12 and 13 respectively reveal a particularly effective manner of the embodiment of the detection substrate and of the magnetic field detection layer applied thereto and of the arrangement of the "resilient" nanowires with the magnetic nanoparticles.

Desirably maximally high signal strengths and high precision to be precise upon acceleration or deceleration in all spatial directions, can be obtained with a sensor in accordance with claim 14.

The invention is explained in more detail with reference to the drawing.

DESCRIPTION OF THE INVENTION

The essential components of the invention and the principle underlying the invention are illustrated schematically in FIGS. 1a to 1d. A nanowire 2 functions as a flexible spring which can bend under the load of the inertial mass of nanowire 2 and magnetic nanoparticle 3 coupled thereto. In this case, the magnetic nanoparticle 3 is expediently fixed to the upper, free end 22 of the nanowire 2, but can also be fixed at any other position along the nanowire 2. The nanowire 2 and the magnetic particle 3 together form the inertial mass tm. The change in the position of the inertial mass tm is detected by means of a magnetic stray field mf emitted by it. Said stray field is generated by magnetic materials used for the production of the nanowire 2 and/or of the nanoparticle 3. The magnetic stray fields ms are detected by magnetoresistive detectors or by such a detector 4 which are or is situated in direct proximity to the nanowires 2. Said magnetoresistive detectors 4 are expediently produced by means of thin-film methods on the substrate 5.

If the position of the inertial mass tm, that is to say of the composite of nanowire 2 plus nanoparticle 3, changes, the strength of the stray field signal in the detector 4 also changes. The intensity of the change depends on the relative movement direction of inertial mass tm and detector 4. A change in distance along the direct connecting straight line generates the largest signal change and changes according to an exponential law with a power of between 2 and 3. Optimized design rules for the concrete construction of the novel sensor 1 can be derived from this.

Figure 1A:
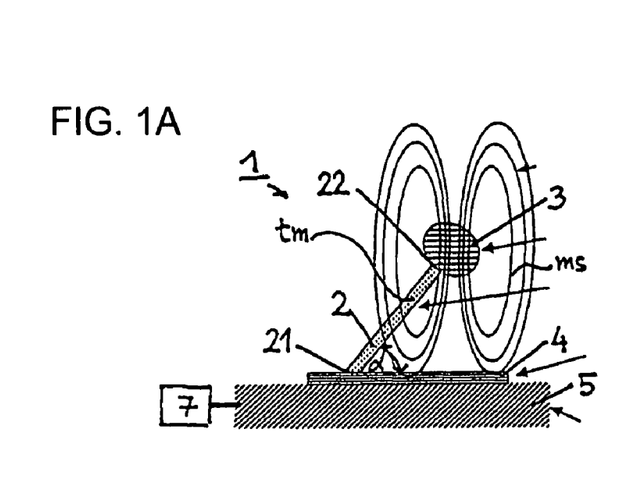
FIGS. 1a to 1c show three signal-generating acceleration sensors of simple design in accordance with the invention, said sensors being different but of substantially the same type, and moreover illustrate in a simple manner the underlying sensor principle of the interaction of magnetic components with the detector layer via magnetic stray fields.

FIG. 1a shows how, from a detector substrate 5 which is coated with the magnetic field detection layer 4 and is concomitantly moved with an object, the single crystal or nanowire 2, which is bound by an end 21 to the substrate 5 or to the detection layer 4 and grows therefrom obliquely upward, projects up at an acute angle α, said single crystal or nanowire carrying at its free end 22 the nanoparticle 3 generating the permanent magnetic stray field ms.

Upon the occurrence e.g. of an acceleration of the object and hence of the substrate 5 and of the detector layer 4 toward the left, the magnetic stray field ms of this system is displaced with slight curvature of the nanowire 2 toward the right and hence also movement of the magnetic nanoparticle 3 toward the right downward, and this small yet highly reproducible movement brings about in the magnetoresistive coating 4 a change in the electrical resistance thereof. This change in resistance is registered by the detection unit 7 and possibly amplified and finally forwarded to a storage, display and/or output unit 8.

The particular advantage of the novel acceleration sensors 1 is that they are present in extremely miniaturized form and can preferably indeed themselves be with their magnetoresistive layer 4 an integral part of detection electronics, in particular of a chip, which enables the nano-design thereof.

Figure 1B:
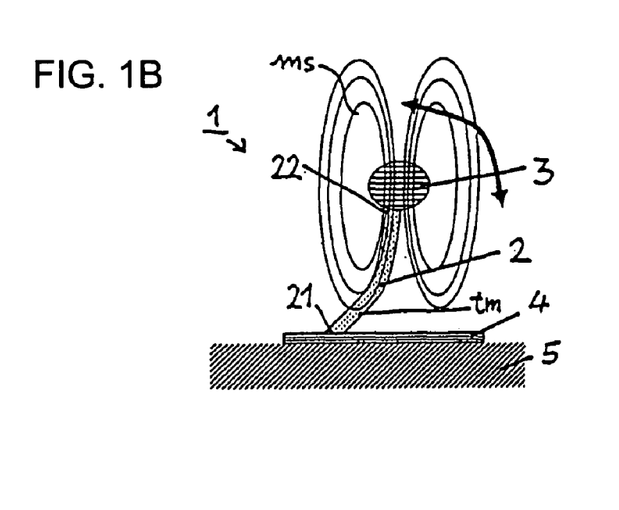
Figure 1C:
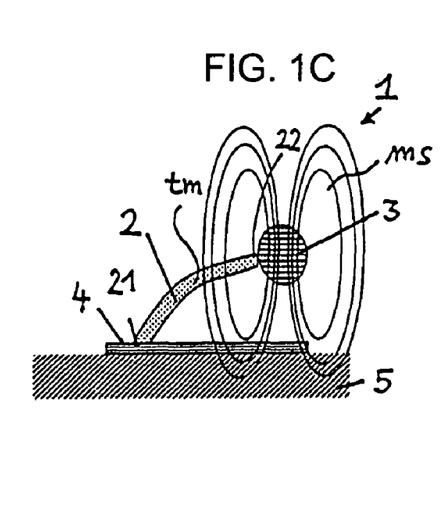

FIG. 1b illustrates an acceleration sensor 1 with nanowire 2 with magnetic nanoparticle 3, said nanowire growing obliquely from the substrate 5 and then curving upward toward the perpendicular, and represents its movement upon acceleration or deceleration by a double-headed arrow, from which relatively small signals should be expected upon acceleration, and in accordance with FIG. 1c a nanowire 2 growing steeply from the substrate 5 is provided, but said nanowire is curved downward toward the magnetoresistive layer 4 and can generate a relatively large or large signal upon acceleration.

Figure 1D:
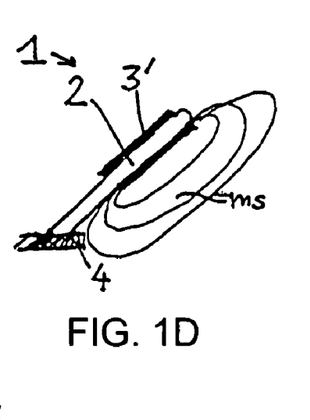

FIG. 1d shows an oblique single crystal or nanowire 2 without a separate mass at its end, although it is equipped there with a magnetic coating 3'.

With reference symbol meanings otherwise remaining the same, FIGS. 2a to 2e show measurement principle and position on the basis of a nanowire 2 growing from the magnetic field coating 4 approximately "centrally" and at a right-angle, a nanowire 2 growing from said coating 4 in right-angled fashion at the edge thereof, and a nanowire 2 which likewise projects up in right-angle fashion and is surrounded by the magnetoresistive layer 4 with a spacing a being maintained, and furthermore a nanowire 2 which projects up from the substrate 5 at the acute angle α at a distance b alongside and finally in the magnetic field detection layer 4.

Figure 3A:
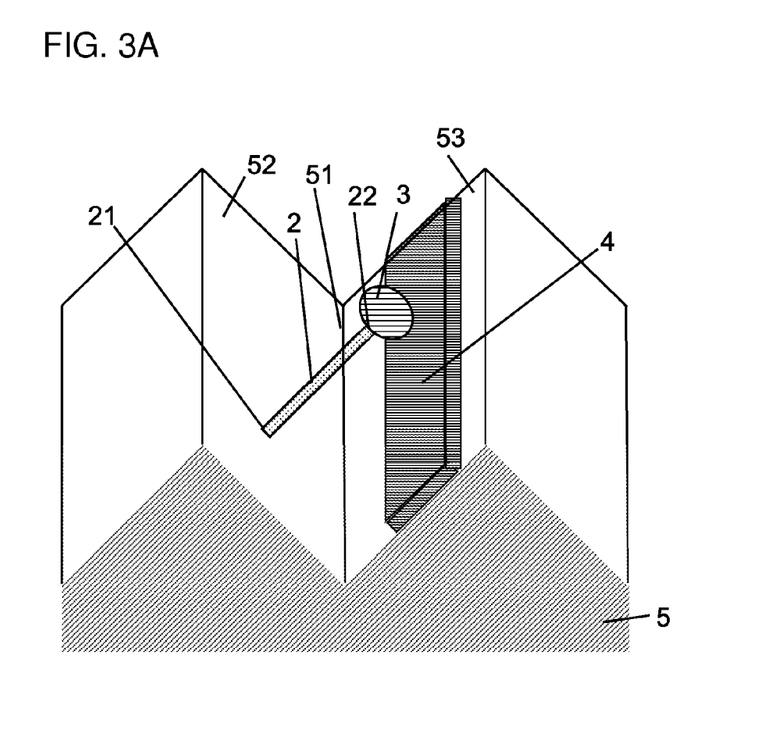
FIGS. 3a to 3c show more complicated embodiments of sensors of the novel type that are sensitive to one-, two- and three-dimensional acceleration and deceleration processes.

With reference symbol meanings otherwise remaining the same, FIG. 3a shows a substrate 5 configured with furrows 51, for instance, wherein one flank 52 at the furrow 51 is coated with the magnetic field detection layer 4, and the nanowire 2 with the nanoparticle 3 projects up from the other flank 52, here without a detection layer,—here perpendicularly and approximately parallel to the flank 51—, whereby a highly sensitive, at least 1-dimensional acceleration sensor 1 is provided.

Figure 3B:
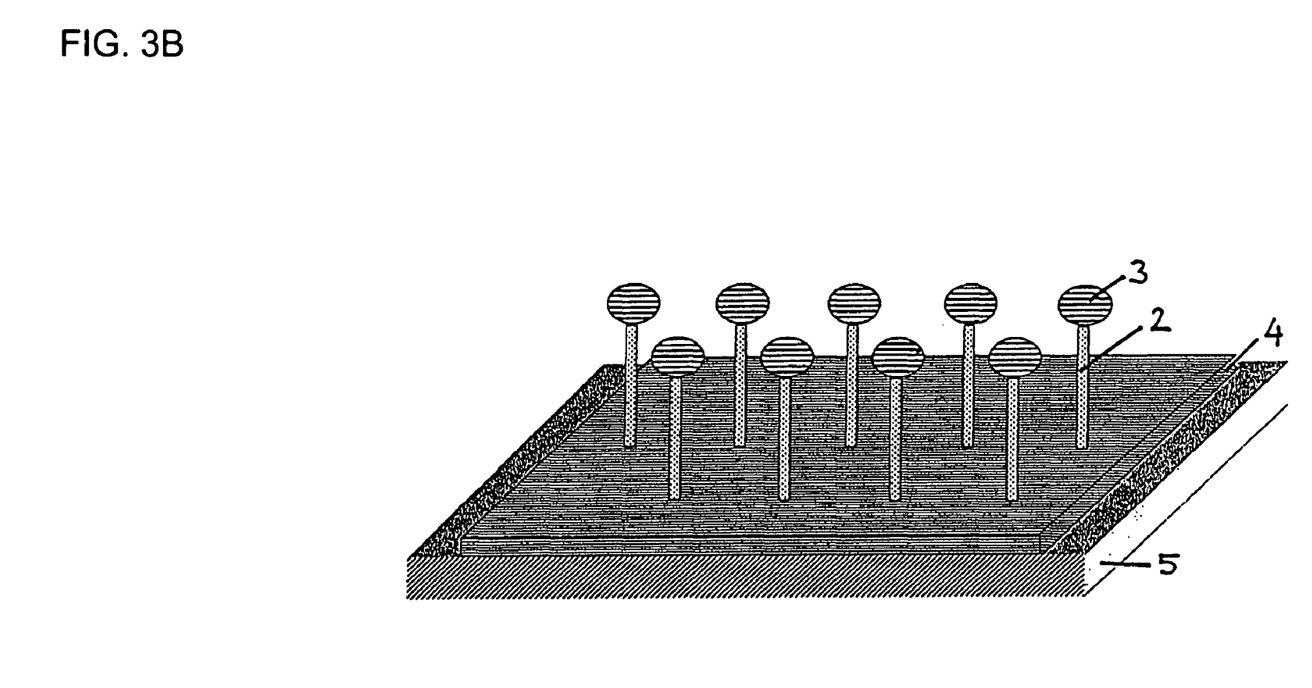

In the case of the sensor 1 in accordance with FIG. 3b, a plurality of upright nanowires 2 in a for example regular arrangement project up perpendicularly from the substrate 5 or from the magnetic field detection layer 4 thereof, whereby a very sensitive 2-dimensional acceleration sensor is provided.

Figure 3C:
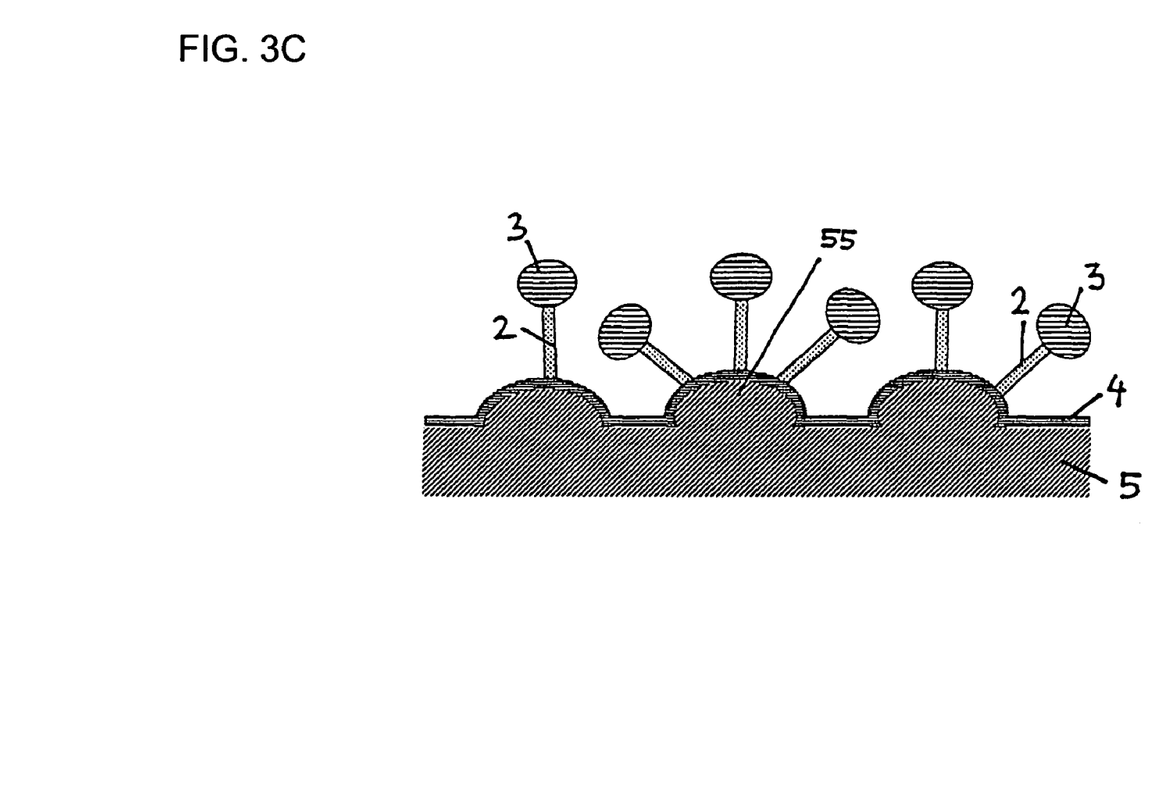

In the case of the sensor 1 in accordance with FIG. 3c, the substrate 5 is embodied with a plurality of here e.g. three "hills" 55 arranged in linearly structured fashion, from the highest locations 551 of which a respective nanowire 2 projects away perpendicularly. In the case of the first hill 55 on the left, no further nanowire is provided; in the case of the hill 55 in the center, both hill flanks 552, 553 are embodied with nanowires 2 projecting up in each case perpendicularly therefrom; and, finally, the right-hand hill 55 carries only a nanowire 2 with the nanoparticle 3 projecting up from said hill from a right-hand flank 553.

This sensor shown in FIG. 3c is suitable, in particular, for very effective detection and determination of acceleration and deceleration processes in all three spatial dimensions.

Figure 2:
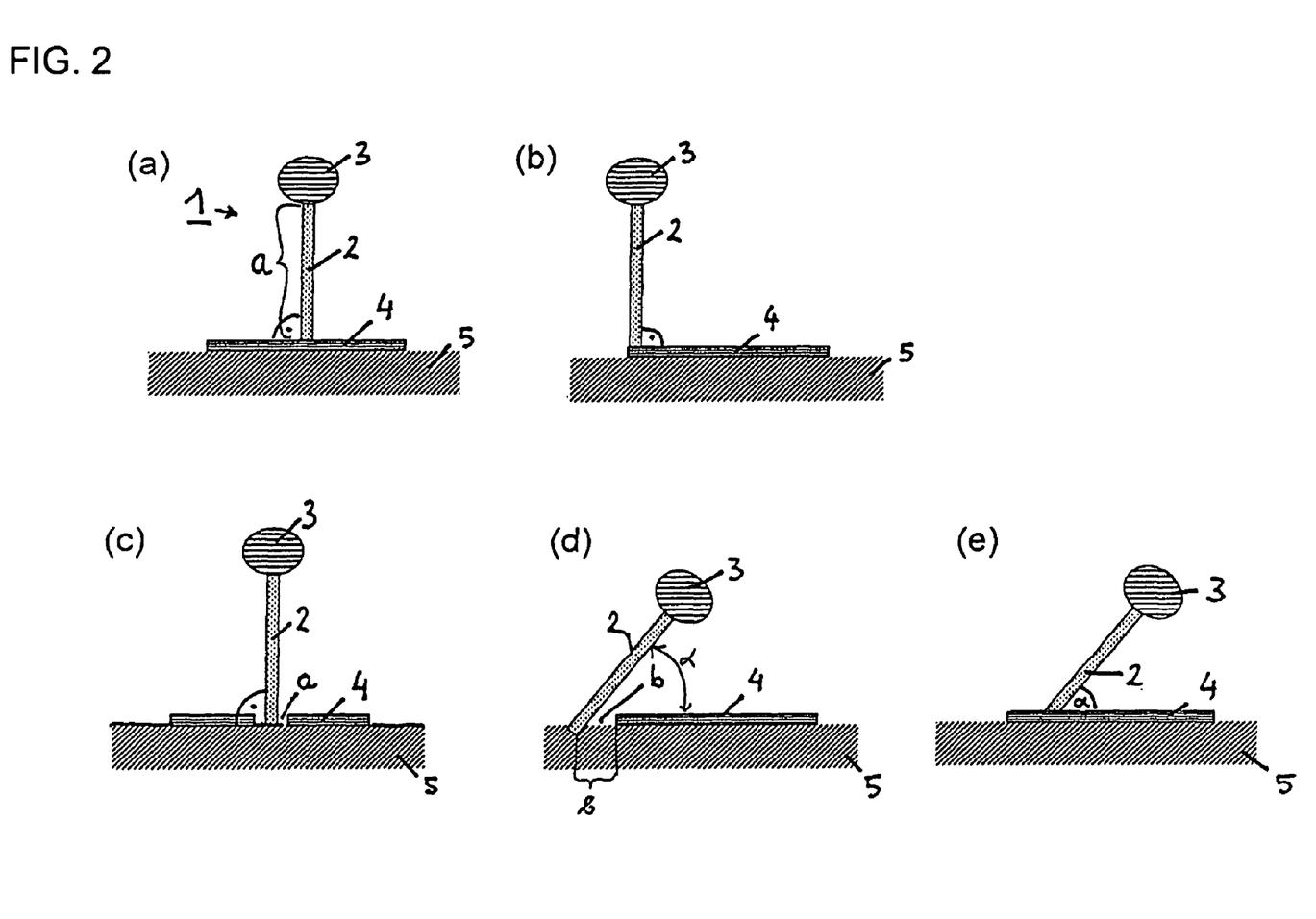
FIGS. 2a to 2e show various arrangements of single crystals or nanowires with magnetic nanoparticles and magnetic field detection layer relative to one another.

The following observations supplement the above explanations:

FIGS. 1 and 2 thus demonstrate the effect of perpendicular and oblique nanowires 2 assuming that the detector 4 runs parallel to the surface of the substrate 5 as a thin layer. Oblique nanowires 2 have an oscillation component perpendicular to the detector 4, and thus generate a distinct change in the stray field components under an oscillation period. FIGS. 2a to 2e show a series of positioning possibilities for the nanowire 2 together with magnetic particle 3 relative to the detector 4.

The magnetic particle 3 can be composed of ferromagnetic or paramagnetic material. Magnetized ferromagnetic nanoparticles 3 independently generate a magnetic stray field ms. An external constant and homogeneous magnetic field can be added in order to amplify said stray field. Such a magnetic field is certainly favorable or necessary for paramagnetic or superparamagnetic particles. In accordance with the invention three preferred possibilities should be mentioned for fitting the magnetic nanoparticle 3, where it should be emphasized that there are by all means further possibilities:

The nanowire 2 is grown using a seed of ferromagnetic or paramagnetic material which is ultimately situated at the tip of the nanowire 2 and can itself generate a magnetic stray field ms.

Magnetic material can be fitted to the nanowire 2 subsequently and in a targeted manner by means of conventional lithography and coating processes. The disadvantage here consists in the additional process steps which become necessary.

Magnetic particles can be coupled via suitable binding sites to the nanowire or seed. This can occur in solution, for example: dissolved magnetic nanoparticles 3 having specific binding sites on the outer skin bind to the surfaces of the nanowire 2 or seed upon contact. A typical binding of the magnetic particle 3 would be for example via a thiol binding to a gold surface of the seed.

The production of the magnetoresistive detectors on the substrate surface is preferably effected by means of the methods of layer production and lithography. In this case, relatively recent magnetoresistive effects such as, for example, giant magnetoresistance GMR and tunneling magnetoresistance TMR are preferred since they supply significantly higher signal amplitudes.

Different dimensionalities of the novel acceleration sensor 1 arise depending on the positioning and orientation of nanowires 2 and magnetoresistive detectors 4. By skillfully setting the growth conditions of the nanowires 2 and the predetermined substrate topographies 5, it is possible to produce both 1-dimensional and 2- and 3-dimensionally sensitive acceleration sensors 1.

The combination of nanowires 2 and magnetic detection as provided in accordance with the present invention permits a unique access to these highly desirable sensor concepts.

Examples of embodiments of 1-, 2- and 3-dimensional sensors 1 are illustrated in FIGS. 3a to 3c.

The configuration in FIG. 3a shows an example of a possible arrangement for a 1-dimensional sensor 1.

Forces parallel to the nanowire 2 have no effect since the nanowire 2 is too stiff. Forces parallel to the sensor layer 4, that is to say in the plane of the paper, do not yield a signal change, since the stray field effect on the sensor 4 remains unchanged. Only movement and forces perpendicular to the sensor layer 4 are detected with maximum signal amplitude.

Nanowires 2 projecting away perpendicularly from the detector layer 4, as shown in FIG. 3b, can move in two dimensions. This means that only forces in a plane can be determined. Such a sensor in accordance with FIG. 3b is isotropically two-dimensional.

FIG. 3c shows one of the possible variants, specifically a very simple variant, of a 3-dimensional sensor 1. Here all forces in all three spatial directions lead to a detector reaction. This sensor 1 is non-specific to the respective direction. However, any acceleration in an arbitrary direction finds a matching nanowire 2 which it can move vertically with respect to the sensor layer 4 and thus trigger a signal.

As far as the advantages of the invention are concerned, the following should finally be noted in this respect:

Cost factor: The production of the novel acceleration sensors comprises simple process steps which are significantly more cost-effective in comparison with the production of traditional sensors of this type. Consequently, the novel product has a crucial cost advantage.

Sensor variability: By simply changing the geometries of the nanowires, the properties of the sensors can be precisely adapted to the respective tasks and be set in a targeted manner without changing the production procedures. The basic layout remains unchanged. In particular, resonant frequencies and frequency responses can be preset, and can also be combined with one another.

Combination: The sensors according to the invention can be combined with other electronic or sensor-technological components in a simple manner.

Mobility: The invention is suitable for wide use. The technical implementation is particularly small and light and consumes little energy and is therefore predestined in particular for incorporation into battery-operated devices.

Radiation hardness: The individual components are resistant to particle and electromagnetic radiation.

Flexibility: The novel sensors are suitable for application in areas of use other than pressure sensors and rotation sensors and thus open up new fields of application.

LITERATURE CONCERNING

Magnetoresistance:
[1] S. A. Wolf et al., Science 294, 1488 (2001)
[2] H. Brückl, M. Brzeska, D. Brinkmann, J. Schotter, G. Reiss, W. Schepper, P. B. Kamp, A. Becker, "Magnetoresistive logic and biochip", J. Magn, Magn. Mater. 282 page 219, 2004.
[3] H. Brückl, M. Panhorst, J. Schotter, P. B. Kamp, A. Becker, "Magnetic particles as markers and carriers of biomolecules", IEErfindung Proc.—Nanobiotechnol. 152, 41 (2005)

Nanowire:
[4] R. S. Wagner, W. C. Ellis, Appl. Phys. Lett. 4 (5), 89 (1964)
[5] I. Givargizov, J. Cryst, Growth 31, 20 (1975)
[6] J. R. Health, F. K. LeGoues, Chem. Phys. Lett. 208, 263 (1993); T. J. Trentler, K. H. Hickmann, S. C. Goel, A. M. Viano, P. C. Gibbons, W. Erfindung Buhro, Science 270, 1791 (1995)
[7] J. Westwater, D. P. Gosain, S. Tomiya, S. Usui, H. Ruda, J. Vac, Sci. Techn. B 15 554 (1997)
[8] A. M. Morales, C. M. Lieber, Science 279, 208 (1998); D. P. Yu, C. S. Lee, I. Bello, X. S. Sun, Y. H. Tang, G. W. Zhou, Z. G. Bai, Z. Zhang, S. Q. Feng, Solid State Commun. 105, 403 (1998)
[9] X. T. Zhou, N. Wang, H. L. Lai, H. Y. Peng, I. Bello, N. B. Wong, C. S. Lee, Appl. Phys. Lett. 74, 3942 (1999)
[10] G. M. Whitesides, J. P. Mathias, C. T. Seto, "Molecular self-assembly and nanochemistry—a chemical strategy for the synthesis of nanostructures", Science 254, 1312 (1991)

The invention claimed is:

1. A miniature sensor for detecting and determining acceleration and deceleration processes of an object, comprising:
a detector substrate mounted for movement concomitantly with the object;
a substantially bar-shaped spring element formed by a single crystal or nanowire of an electroneutral material, said spring element having a first end connected to said detector substrate and a free end, said spring element projecting from said substrate and moving concomitantly with said substrate;
a magnet emitting a permanent, constant stray magnetic field carried on said spring element, at least in a delimited region along an extent thereof, said magnet being moveable only along a substantially spherical surface having a midpoint in each case at a starting point or at said first end of said spring element, said magnet being selected from the group consisting of a coating, a mass, and a nanoparticle of the type, said spring element and said magnet jointly forming an inertial mass; and
a single continuous magnetic field detection layer sensitive to field strength changes disposed in a vicinity of said first end of said spring element, and an indication unit connected to said detection layer.

2. The miniature sensor according to claim 1, wherein said detection layer is formed on said substrate and said substrate forms a sensor component of a miniature magnetic field detection unit including said indication unit.

3. The miniature sensor according to claim 1, wherein said coating is carried at or in a vicinity of said free end of said spring element.

4. The miniature sensor according to claim 1, wherein said detection layer is a single layer composed of a magnetoresistive material.

5. The miniature sensor according to claim 1, wherein said bar-shaped spring element is a self-assembled single crystal or nanowire.

6. The miniature sensor according to claim 5, wherein said single crystal or nanowire is formed by self-assembled growth directly from said detector substrate (5).

7. The miniature sensor according to claim 1, wherein said magnet is a magnetic nanoparticle itself forming a seed for growing the single crystal or nanowire and being raised with said free end thereof from said substrate or from said magnetic field detection layer.

8. The miniature sensor according to claim 1, wherein said magnet is formed of paramagnetic or ferromagnetic material.

9. The miniature sensor according to claim 8, wherein said magnet is formed of a pure ferromagnet selected from the group consisting of Fe, Co, Ni, or oxides thereof.

10. The miniature sensor according to claim 8, wherein said magnet is formed of $Fe_3O_4$.

11. The miniature sensor according to claim 1, wherein said magnetic field detection layer is formed by thin-film systems exhibiting giant magnetoresistance or tunneling magnetoresistance.

12. The miniature sensor according to claim 11, wherein said magnetic field detection layer is formed by multilayers of a Cu/NiFe system.

13. The miniature sensor according to claim 1, wherein said magnet is a single crystal or nanowire formed by growing up on said detector substrate below a seed particle disposed thereon, in a gas or liquid phase containing the single crystal or nanowire material.

14. The miniature sensor according to claim 13, wherein said seed particle is a nanoparticle composed of a magnetic material.

15. The miniature sensor according to claim 14, wherein said magnetic nanoparticle is bound by chemical binding to the single crystal or nanowire.

16. The miniature sensor according to claim 15, wherein said magnetic nanoparticle is bound to said free end of said spring element.

17. The miniature sensor according to claim 1, wherein said magnet is a magnetic coating on said spring element applied thereto by a vapor deposition process or a lithography process.

18. The miniature sensor according to claim 1, wherein said spring element is a single crystal or nanowire formed with or from silicon or gallium arsenide or from a magnetic material.

19. The miniature sensor according to claim 1, wherein said magnetic field detection layer is applied on said detector substrate without or with a spacing around said spring element projecting up from said substrate.

20. The miniature sensor according to claim 1, wherein said spring element is a crystal or nanowire disposed at an edge of said magnetic field detection layer.

21. The miniature sensor according to claim 1, wherein said spring element is a single crystal or nanowire projecting with an angle different than 90° from a surface of said substrate or with respect to said magnetic field detection layer.

22. The miniature sensor according to claim 21, wherein said spring element is a curved rod.

23. The miniature sensor according to claim 1, wherein said detector substrate is embodied with a plurality of furrows or valleys running parallel to one another and having a first flank from which said spring element projects and a second flank carrying said magnetic field detection layer.

24. The miniature sensor according to claim 1, wherein said spring element is one of a plurality of single crystals or nanowires projecting from said detector substrate or said magnetic field detection layer at a given angle and parallel to one another.

25. The miniature sensor according to claim 24, wherein said spring elements are arranged in a regular grid arrangement.

26. The miniature sensor according to claim 24, wherein said spring elements project at a right angle from said detector substrate or said magnetic field detection layer.

27. The miniature sensor according to claim 1, wherein said detector substrate is formed with a plurality of elevations provided with a magnetic field detection layer.

28. The miniature sensor according to claim 27, wherein said elevations are arranged in a grid and wherein said spring elements project from relatively highest points or peaks of said elevations, and wherein said elevations have flanks from which said spring elements with said magnets project in each case.

* * * * *